Nov. 7, 1967 KUNIO NISHIOKA ET AL 3,351,337
AIR SPRING
Filed Aug. 29, 1966
3 Sheets-Sheet 1

INVENTORS
Kunio Nishioka
Seitchi Nishimura &
Seinosuke Kato

BY *(signature)*
ATTORNEY

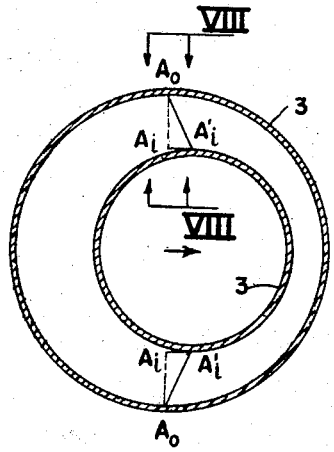
FIG.7.
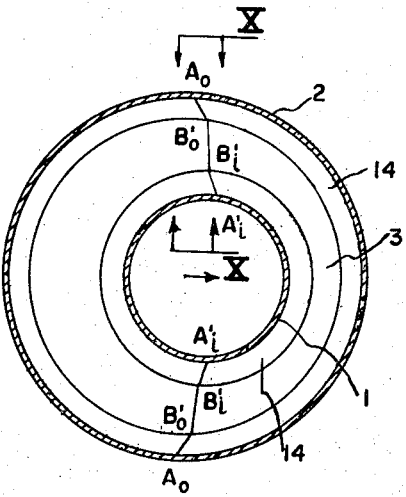
FIG.9.
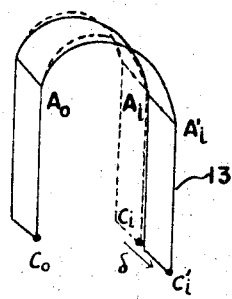
FIG.8.
FIG.11.
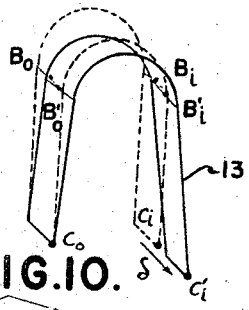
FIG.10.
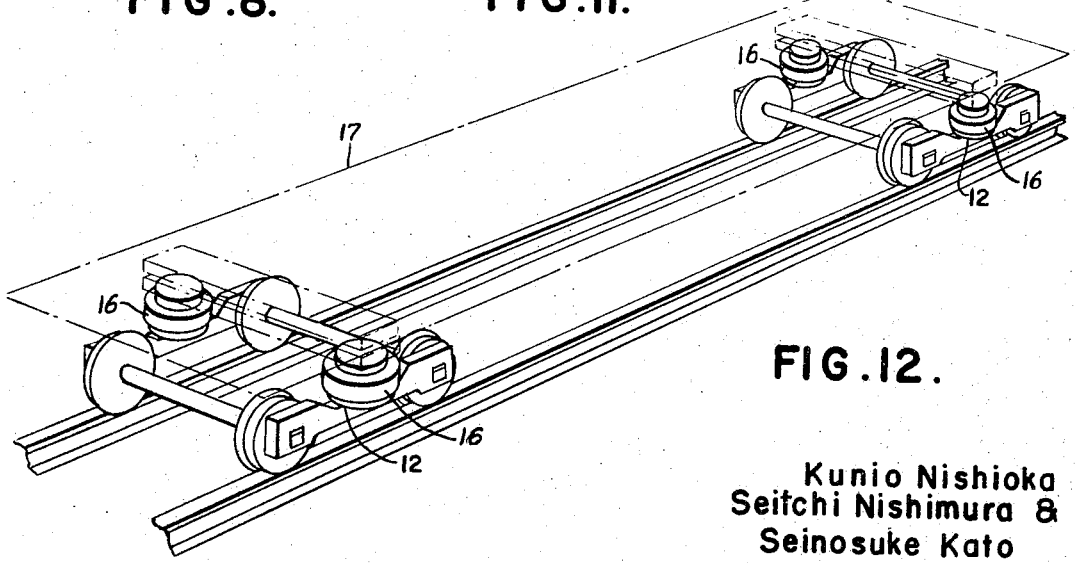
FIG.12.
Kunio Nishioka
Seitchi Nishimura &
Seinosuke Kato

United States Patent Office 3,351,337
Patented Nov. 7, 1967

3,351,337
AIR SPRING
Kunio Nishioka, Kyoto, and Seitchi Nishimura and Seinosukeo Kato, Nishinomiya, Japan, assignors to Sumimoto Metal Industries Ltd., Osaka, Japan
Filed Aug. 29, 1966, Ser. No. 575,658
Claims priority, application Japan, Sept. 10, 1962, 37/38,890
6 Claims. (Cl. 267—65)

ABSTRACT OF THE DISCLOSURE

An air spring yielding desired vertical and lateral spring constants and having an inner cylinder, an outer cylinder and a circumferential member. Opening ends of the cylinders are differently tapered. The cylinders and member are assembled at the opening ends. The circumferential member is in contact with the tapered surfaces and seals the internal cylinder volume.

---

This is a continuation-in-part application to our copending parent application Ser. No. 306,477, filed Sept. 4, 1963, for an Air Spring. The priority dates to which the parent application is entitled are claimed for all subject matter common therewith.

This invention relates to an air spring and, more particularly, to an air spring having an inner cylinder, an outer cylinder and a flexible circumferential member situated between said two cylinders.

As is well known to those skilled in the art, it is necessary for a railway car to be provided with spring action in the vertical direction, and in the lateral direction. The lateral spring action has usually been provided by a mechanical link mechanism, such as a swing bolster.

Some railway trucks are actually being built with only air springs. The principle on which the air spring is utilized in these trucks is that the restoring force in the lateral direction is obtained by the rigidity of the bellows material of the spring. Therefore, tests and researches have hitherto been made to obtain satisfactory spring constants derived from a combination of kinds of rubber used for the bellows, the material and quantity of reinforcing cord in the bellows and the cord angle.

However, because the restoring force in the lateral direction has been obtained by the rigidity of the rubber bellows of the air spring, such springs inherently have defects. For instance, their spring constant decreases with displacement and becomes zero in the most cases. Another defect is that the hysteresis loop between the restoring force and the displacement is large and the car body thus has different equilibrium positions. Accordingly, the suspended body can not usually be maintained at a neutral point and the body stalls when a force is applied to the body to bias it. Moreover, deterioration of the bellows member and temperature variation during use causes the spring performance to be modified.

It is the principal object of this invention to provide an air spring in which a spring action is obtained in the horizontal direction by the variation in the pressure receiving area in the horizontal direction caused by the deformation of the circumferential member without relying upon the restoring force due to the elasticity of the circumferential member itself.

It is another object of this invention to provide an air spring in which the spring constant increases in proportion to the load to be applied to the spring in the horizontal direction as well as in the vertical direction to assure a stable spring suspension.

Another object of the invention is to provide an air spring whose horizontal and vertical spring constants can be adjusted independently.

Another object of the invention is to provide an air spring that can hold varying static loads at a fixed level and that gives a constant natural frequency independently of the static load held by the spring.

Another object of the invention is to provide an improved suspension for railway cars.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 7 is a plan sectional view of a component of an embodiment of the invention.

FIGURE 8 is a partial isometric view taken along the lines VIII—VIII of FIGURE 7.

FIGURE 9 is a sectional view of an embodiment of the invention with illustration of its lateral deformation.

FIGURE 10 is a partial isometric view of the circumferential member of FIGURE 9 along the lines X—X of FIGURE 9.

FIGURE 11 is a plan view of a layer of reinforcement in the circumferential member of the invention.

FIGURE 12 is a perspective view of a railway car body supported only on two air springs per truck.

Figure 1:
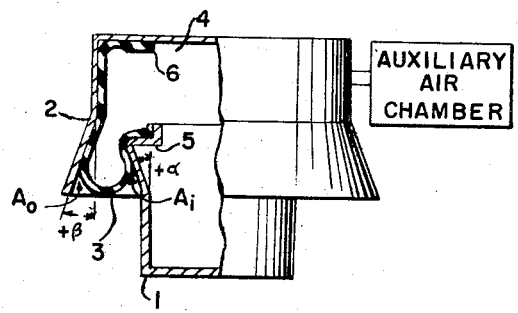
FIGURE 1 is a partially sectioned, elevational view of an embodiment of the air spring of the invention.

In the air spring shown in FIG. 1, a tapered portion is provided on the wall of the inner cylinder 1 and on the wall of the outer cylinder 2. The interiors of the cylinders form internal air chambers. The opening end of the wall of inner cylinder 1 is tapered at angle $\alpha$ so as to form a conical frustum. The opening end of the wall of outer cylinder 2 is also tapered at angle $\beta$ so as to form another conical frustum. The inclination may be straight or curved and one of the angles can be made zero. Flexible circumferential member 3 is affixed hermetically to the outer surface of inner cylinder 1 at the rim 5 and to the inner surface of outer cylinder 2 at point 6, which is in the interior away from its taper. The insides of inner cylinder 1 and outer cylinder 2 are communicating. An auxiliary air chamber is connected with the interior of the air spring.

Figure 2:
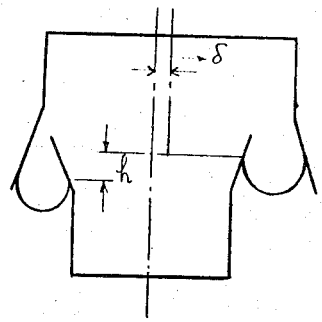
FIGURE 2 is a diagrammatic view of an embodiment of the invention.

When the air spring is subjected to a displacement $\delta$ in the lateral direction, as shown in FIG. 2, a difference $h$ occurs between the two sides of the circumferential member. A difference in pressure receiving areas is caused, thereby giving the effect of a spring in that the displacement is resisted.

The circumferential member 3 is made of rubber or similar elastic material. It has thin walls, such that it has substantially no bending resistance. Its reinforcements lie substantially in radial planes. FIG. 11 shows one layer of reinforcing strings which, in assembly, is integrally situated within the rubber. The reinforcing strings can be made of, for instance, nylon.

Figure 3:
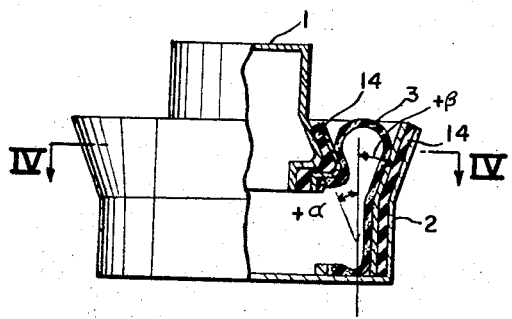
FIGURE 3 is an elevational view of an embodiment of the invention, partially sectioned along the line III—III of FIGURE 4.
Figure 4:
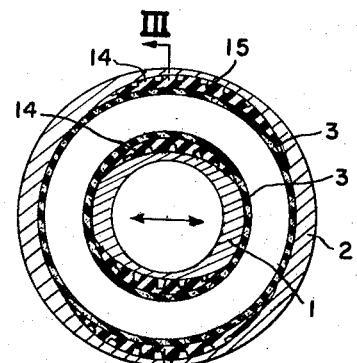
FIGURE 4 is a section view of the embodiment of FIGURE 3 along the line IV—IV of FIGURE 3.

FIGS. 3 and 4 show an embodiment of the invention in which elastic pieces 14 are placed between the circumferential member and the inner and outer cylinders. Ribs 15 are provided to further reduce the shear resistance of the pieces. The elastic pieces 14 are provided in this embodiment only laterally to the direction of lateral displacement, which is shown by the double-headed arrow in FIG. 4. Although the circumferential member is in contact with the elastic pieces, it is not connected to them, except at its ends.

Figure 5:
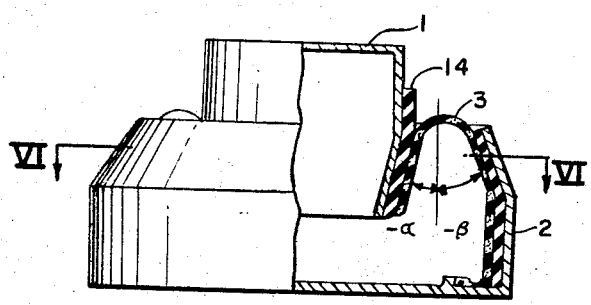
FIGURE 5 is an elevational view of an embodiment of the invention, partially sectioned along the line V—V of FIGURE 6.
Figure 6:
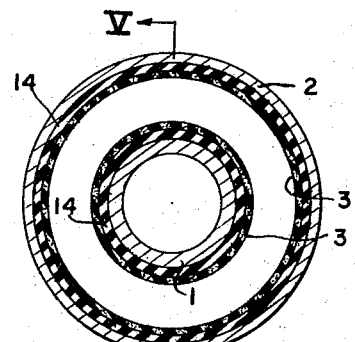
FIGURE 6 is a section view of the embodiment of FIGURE 5 along the line VI—VI of FIGURE 5.

The embodiment shown in FIGS. 5 and 6 is provided with elastic plates 14 over all the circumferential surfaces of the inner wall surface of the outer cylinder and the outer wall surface of the inner cylinder.

The spring constant $K_v$ of the air springs of the invention in the vertical direction is given as follows:

$$K_v = k_{v_1} + k_{v_2} + k_{v_3} \tag{1}$$

$k_{v_1}$ = that part of the spring constant due to the variation in the air volume of the air spring,
$k_{v_2}$ = that part of the spring constant due to the variation in the pressure receiving area accompanied by the deformation of the circumferential member,
$k_{v_3}$ = that part of the spring constant due to the elastic deformation of the circumferential member.

The deformation of the circumferential member in the vertical direction of the air spring is a bending deformation. However, the circumferential member is made of a relatively thin membrane so that the bending stiffness is extremely small. Therefore, $k_{v_3}$ is negligible compared with $k_{v_1}$ and $k_{v_2}$.

In the case of the air springs of the invention, $$k_{v_1} = \gamma \pi^2 R_e^4 \frac{P_o + P_a}{V_o + V_T} \tag{2}$$

where:
$\gamma$ = the polytropic index,
$R_e$ = the radius of the effective area,
$P_o$ = the internal gage pressure of air,
$P_a$ = atmospheric pressure,
$V_o$ = the volue of the air spring,
$V_T$ = the volume of any auxiliary air chamber.

$$k_{v_2} = -2\pi \mu_1(\alpha, \beta) \cdot P_o \tag{3}$$

where:

$$\mu_1(\alpha, \beta) = \frac{\sin(\alpha+\beta) + (\pi+\alpha+\beta)\sin\alpha\sin\beta}{2\{1+\cos(\alpha+\beta) + \frac{1}{2}(\pi+\alpha+\beta)\sin(\alpha+\beta)\}} \tag{3a}$$

Combining $k_{v_1}$ and $k_{v_2}$, we obtain:

$$k_v = \gamma \pi^2 R_e^4 \frac{P_o + P_a}{V_o + V_T} - 2\pi \mu_1(\alpha, \beta) \cdot P_o \tag{4}$$

The spring constant $K_L$ in the lateral direction of the air spring is given as follows:

$$K_L = k_{L_1} + k_{L_2} \tag{5}$$

where:
$k_{L_1}$ = that part of the spring constant due to the variation in the pressure receiving area in lateral direction accompanied by the deformation of the circumferential member
$k_{L_2}$ = that part of the spring constant due to the elastic strain of the circumferential member.

There is no variation in the volume of the air spring when the air spring displaces in the lateral direction.

As shown in FIG. 7, when the air spring displaces in the lateral direction, curve $A_oA_i$ displaces to curve $A_oA_i'$. More particularly, as shown in FIG. 8, point $A_i$ displaces to point $A_i'$, both existing on the outer surface of the inner cylinder. Therefore, the circumferential member between point $A_o$ and point $A_i'$ receives a twisting and shearing stress.

In the lateral direction, in general, $k_{L_2}$ is usually larger than $k_{L_1}$ so that the substantial part of the spring constant $k_L$ is occupied by $k_{L_2}$.

In order to reduce $k_{L_2}$, the circumferential member is made very stiff in the direction of the meridian plane while in the circumferential direction it is made just a little stiff so that the deformation along curve $A_oA_i$ is available freely. This is explained in the discussion of FIG. 11.

As shown in FIGS. 9 and 10, elastic pieces 14 are provided between the circumferential member and the cylinders. When the air spring displaces in the lateral direction the elastic piece deforms to the effect that point $B_o$ displaces to $B_o'$, point $B_i$ to $B_i'$ and point $C_i$ to $C_i'$.

When the air spring is constructed in accordance with the invention, $k_{L_2}$ becomes 0 so that $k_L$ is substantially equal to $k_{L_1}$.

$k_L$ is given as follows:

$$k_L = \mu_2(\alpha, \beta) \frac{\pi^2}{4} R_e P_o \tag{6}$$

where:

$$\mu_2(\alpha, \beta) = -\frac{\pi\{\sin(\alpha+\beta) - (\pi+\alpha+\beta)\cos\alpha\cos\beta\}}{8\{1+\cos(\alpha+\beta) + \frac{1}{2}(\pi+\alpha+\beta)\sin(\alpha+\beta)\}} \tag{7}$$

$R_e$ = the effective radius receiving the pressure in the vertical direction, and $P_o$ = inner pressure of the air spring.

It is clear from the above equations that $k_L$ is proportional to $P_o$. This results because $k_{L_2}$ is zero in the present invention. Because $k_{L_2}$ is zero, the mentioned prior art defects inherent in an air spring having an appreciable $k_{L_2}$ are eliminated.

The spring constant $k_L$ in the lateral direction increases as the inner pressure $P_o$ of the air spring increases in proportion to the weight of the car body suspending on the air spring. Therefore, the result is that the air spring of this invention provides a constant inherent variation in the displacement in the lateral direction as well as in the horizontal direction regardless of the weight of the car body. Furthermore, since the frequency $f_L$ is proportional to $$\sqrt{\frac{k_L}{m}}$$

where $m$ equals mass, the frequency is constant, since $k_L$ and $m$ are both proportional to $P_o$.

Equation 4 shows that it is also possible, by adjustment of $(V_o+V_T)$ and $\mu_1$, to make $K_v$ proportional to $P_o$. When this is the case, static loads are held at a fixed level, independently of the size of the load.

Figure 14:
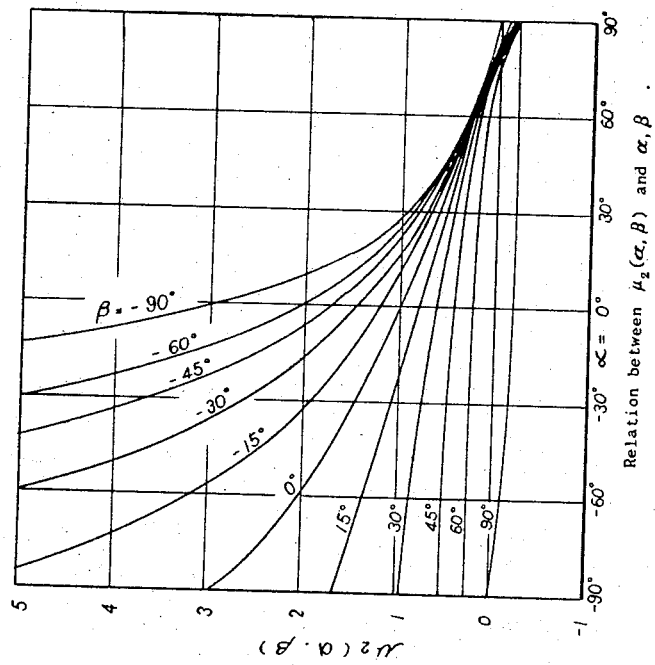
FIGURE 14 is a graph of $\mu_2(\alpha,\beta)$.
Figure 13:
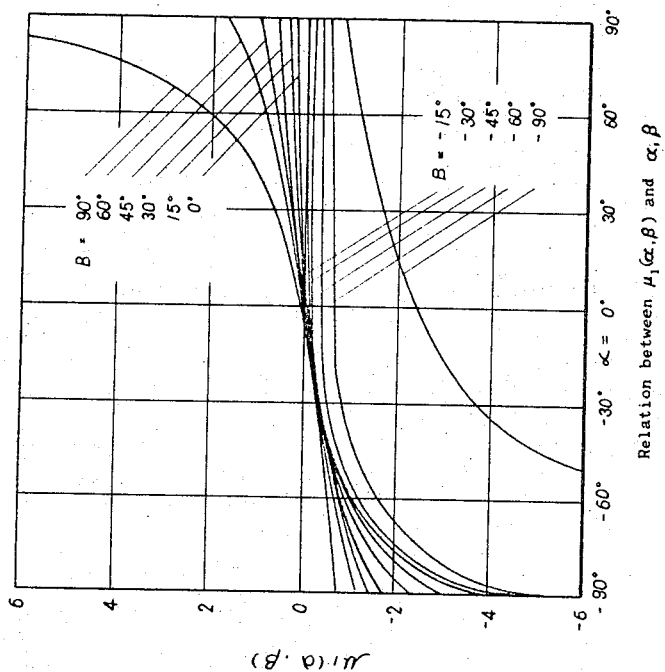
FIGURE 13 is a graph of $\mu_1(\alpha,\beta)$.

The tapers of the inner and outer cylinders can be used to obtain desired spring constants in the air spring of the invention. Thus, for a desired vertical spring constant $K_v$ and for fixed $\gamma$, $R_e$, $P_o$, $V_o$, and $V_T$, Equation 4 can be solved for $\mu_1$. This gives $\mu_1$ equals a first constant. This first constant can be equal to the right side of Equation 3a. In the same manner, the right side of Equation 7 can be set equal to a second constant. Thus, two equations are obtained for $\alpha$ and $\beta$, thereby allowing their determination. FIGURES 13 and 14, which are graphs of Equations 3a and 7, can be used in this determination.

Alternatively, the tapers of the inner and outer cylinders can be used only for the lateral spring constant and the quantity $(V_o+V_T)$ can be used to adjust the vertical spring constant. In this case, Equation 6 is solved to give $\mu_2$ equals a third constant. This third constant is set equal to the right hand side of Equation 7 and $\alpha$ and $\beta$ are determined as one of the solutions of this single equation. Then, with $\alpha$ and $\beta$ known, $\mu_1$ of Equation 3a can be determined, thus enabling solution of Equation 4 for $V_o+V_T$. Although the analyses herein always include the term $V_T$, it, of course, is obvious that $V_T$=zero if there is no auxiliary chamber. The quantity $V_o+V_T$ is called the effective spring volume.

The effective area $R_e$, which occurs repeatedly in the above equations, can be determined according to the following equation:

$$R_e = \sqrt{\frac{R_i^2 \cos \beta + R_o^2 \cos \alpha}{\cos \alpha + \cos \beta}} \quad (8)$$

where $R_i$ is the radius to the point $A_i$ and $R_o$ is the radius to the point $A_o$, as shown in FIG. 1.

FIGURE 12 shows how the springs of this invention can be used to support a railway car body. Only two springs 16 are used per truck 12. These springs are situated on opposite sides of the trucks above the tracks. The cylinders are attached rigidly and vertically to car 17 and truck 12. This suspension gives an improved ride with no rocking. No supplemental lateral spring system is needed.

The drawings are to scale in a preferred embodiment of the invention.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention set forth in the appended claims.

We claim:
1. An air spring, comprising: an inner cylinder having an opening end and a rim thereof; an outer cylinder having an opening end; the opening end of said inner cylinder having a tapered external surface; the opening end of said outer cylinder having a tapered internal surface; the opening end of the inner cylinder inserted within the opening end of the outer cylinder; a thin-walled circumferential member lying partly in contact with the tapered surfaces of the opening ends and hermetically sealed to the inner cylinder at said rim and to the outer cylinder in its interior away from said opening end, said tapered external surface being tapered at an angle $\alpha$, said tapered internal surface being tapered at an angle $\beta$, said angles being substantially determined by a solution of the following equations:

$$K_L = \mu_2(\alpha, \beta) \frac{\pi^2}{4} R_e P_o$$

$$K_v = \gamma \pi^2 R_e^4 \frac{P_o + P_a}{V_o + V_T} - 2\pi \mu_1(\alpha, \beta) P_o R_e$$

$$\mu_2(\alpha, \beta) = \frac{\pi \{\sin(\alpha+\beta) - (\pi+\alpha+\beta) \cos \alpha \cos \beta\}}{8\{1 + \cos(\alpha+\beta) + \frac{1}{2}(\pi+\alpha+\beta) \sin(\alpha+\beta)\}}$$

$$\mu_1(\alpha, \beta) = \frac{\sin(\alpha+\beta) + (\pi+\alpha+\beta) \sin \alpha \sin \beta}{2\{1 + \cos(\alpha+\beta) + \frac{1}{2}(\pi+\alpha+\beta) \sin(\alpha+\beta)\}}$$

where $K_V$ = the desired spring constant in the vertical direction,
$K_L$ = the desired spring constant in the lateral direction,
$R_e$ = the radius of the effective area,
$\gamma$ = the polytropic index,
$P_o$ = the internal gage pressure of air,
$P_a$ = atmospheric pressure,
$V_o$ = the volume of the air spring, and
$V_T$ = the volume of any auxiliary air chamber, and where $\alpha$ and $\beta$ have different values.

2. An air spring as claimed in claim 1, said circumferential member being of elastic material and having reinforcing strings lying substantially in planes radiating from and containing the aligned axes of the cylinders of the spring.

3. An air spring as claimed in claim 1, further comprising an auxiliary air chamber communicating with the air chamber formed by the cylinders and the circumferential member.

4. An air spring as claimed in claim 1, further comprising elastic pieces; one of said pieces lying between and in contact with the inner cylinder and the circumferential member and attached to the inner cylinder; and one of said pieces lying between and in contact with the outer cylinder and the circumferential member and attached to the outer cylinder.

5. An air spring as claimed in claim 4, said elastic pieces having contact with the cylinders only along ribs extending approximately parallel to the axes of the cylinders.

6. A railway car, comprising: two trucks; two cylinder air springs mounted on each truck at laterally symmetrical positions; said air springs having their cylindrical axes vertical; and a car body mounted only on the air springs; said air springs each comprising: an inner cylinder having an opening end and a rim thereof; an outer cylinder having an opening end; the opening end of said inner cylinder having a tapered external surface; the opening end of said outer cylinder having a tapered internal surface; the opening end of the inner cylinder inserted within the opening end of the outer cylinder; a thin-walled circumferential member lying partly in contact with the tapered surfaces of the opening ends and hermetically sealed to the inner cylinder at said rim and to the outer cylinder in its interior away from said opening end, said tapered external surface being tapered at an angle $\alpha$, said tapered internal surface being tapered at an angle $\beta$, said angles being substantially determined by a solution of the following equations:

$$K_L = \mu_2(\alpha, \beta) \frac{\pi^2}{4} R_e P_o$$

$$K_v = \gamma \pi^2 R_e^4 \frac{P_o + P_a}{V_o + V_T} - 2\pi \mu_1(\alpha, \beta) P_o R_e$$

$$\mu_2(\alpha, \beta) = \frac{\pi \{\sin(\alpha+\beta) - (\pi+\alpha+\beta) \cos \alpha \cos \beta\}}{8\{1 + \cos(\alpha+\beta) + \frac{1}{2}(\pi+\alpha+\beta) \sin(\alpha+\beta)\}}$$

$$\mu_1(\alpha, \beta) = \frac{\sin(\alpha+\beta) + (\pi+\alpha+\beta) \sin \alpha \sin \beta}{2\{1 + \cos(\alpha+\beta) + \frac{1}{2}(\pi+\alpha+\beta) \sin(\alpha+\beta)\}}$$

where $K_V$ = the desired spring constant in the vertical direction,
$K_L$ = the desired spring constant in the lateral direction,
$R_e$ = the radius of the effective area,
$\gamma$ = the polytropic index,
$P_o$ = the internal gage pressure of air,
$P_a$ = atmospheric pressure,
$V_o$ = the volume of the air spring, and
$V_T$ = the volume of any auxiliary air chamber, and where $\alpha$ and $\beta$ have different values.

References Cited

UNITED STATES PATENTS 2,910,014   10/1959   Candlin et al. _____ 267—69

FOREIGN PATENTS 848,995   9/1960   Great Britain.
1,161,423   8/1958   France.

ARTHUR L. LA POINT, *Primary Examiner.*

R. M. WOHLFARTH, *Assistant Examiner.*

UNITED STATES PATENT OFFICE
CERTIFICATE OF CORRECTION

Patent No. 3,351,337                                                     November 7, 1967

Kunio Nishioka et al.

It is certified that error appears in the above identified patent and that said Letters Patent are hereby corrected as shown below:

In the heading to the printed specification, lines 4 and 5, "Summimoto Metal Industries Ltd." should read -- Sumimoto Metal Industries Ltd. --.

Signed and sealed this 21st day of April 1970.

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,351,337

November 7, 1967

Kunio Nishioka et al.

It is certified that error appears in the above identified patent and that said Letters Patent are hereby corrected as shown below:

In the heading to the printed specification, lines 4 and 5, "Sumimoto Metal Industries Ltd." should read -- Sumitomo Metal Industries, Ltd. --.

This certificate supersedes Certificate of Correction issued April 21, 1970.

Signed and sealed this 11th day of August 1970.

(SEAL)
Attest:

Edward M. Fletcher, Jr.
Attesting Officer

WILLIAM E. SCHUYLER, JR.
Commissioner of Patents